United States Patent
Hirabayashi

(10) Patent No.: US 8,300,324 B2
(45) Date of Patent: Oct. 30, 2012

(54) LENS BARREL AND IMAGING DEVICE

(75) Inventor: Koichiro Hirabayashi, Osaka (JP)

(73) Assignee: Panasonic Corporation, Osaka (JP)

( * ) Notice: Subject to any disclaimer, the term of this patent is extended or adjusted under 35 U.S.C. 154(b) by 41 days.

(21) Appl. No.: 12/844,951

(22) Filed: Jul. 28, 2010

(65) Prior Publication Data
US 2011/0026146 A1   Feb. 3, 2011

(30) Foreign Application Priority Data
Jul. 31, 2009   (JP) .................... 2009-178593

(51) Int. Cl.
*G02B 9/00*   (2006.01)
(52) U.S. Cl. ........................ 359/738; 359/819
(58) Field of Classification Search ............. 359/819, 359/738
See application file for complete search history.

(56) References Cited

U.S. PATENT DOCUMENTS

| 5,079,575 | A * | 1/1992 | Nii et al. ................ 396/63 |
| 5,889,623 | A | 3/1999 | Ueda et al. |
| 2004/0109243 | A1 | 6/2004 | Orimo et al. |
| 2004/0210009 | A1 * | 10/2004 | Kobayashi et al. ........... 525/433 |
| 2006/0291076 | A1 * | 12/2006 | Watanabe et al. ............ 359/811 |
| 2008/0019026 | A1 * | 1/2008 | Feng et al. .................... 359/819 |
| 2010/0271705 | A1 * | 10/2010 | Hung ............................ 359/601 |

FOREIGN PATENT DOCUMENTS

| JP | 2530936 | 1/1997 |
| JP | 2001-004895 | 1/2001 |
| JP | 2002-014268 | 1/2002 |
| JP | 2003-270507 | 9/2003 |
| JP | 2009-116085 | 5/2009 |

OTHER PUBLICATIONS

Office Action for related U.S. Appl. No. 12/842,557 mailed Sep. 26, 2011.

* cited by examiner

*Primary Examiner* — James Jones

(74) *Attorney, Agent, or Firm* — Renner, Otto, Boiselle & Sklar, LLP

(57) ABSTRACT

The lens barrel of the present invention includes: a lens; and a light blocking member provided in the vicinity of the lens for blocking part of light traveling toward the lens, a main constituent of the light blocking member being a thermoplastic elastomer resin.

11 Claims, 6 Drawing Sheets

LENS BARREL AND IMAGING DEVICE

BACKGROUND OF THE INVENTION

1. Field of the Invention

The present invention relates to a lens barrel of an imaging device. More particularly, the present invention relates to a lens barrel which includes a light blocking member that is provided so as to cover a peripheral part of a lens for blocking unwanted light rays traveling toward the lens.

2. Description of the Related Art

Optical devices, such as still cameras, focus light rays coming into a lens barrel using lenses and photograph an image of the converged light rays using a film or imaging element. However, inside the lens barrel, there are unwanted light rays which are not necessary for photographing, for example, light rays which are reflected inside the lens barrel to reach the lenses, as well as light rays necessary for photographing. When unwanted light rays reach a film or imaging element, a photographed subject image results in a ghost or flare image. Therefore, it is necessary to block such unwanted light rays so as not to enter the lenses.

A conventional lens barrel is described with reference to FIG. 7.

FIG. 7 is a partially enlarged view of a conventional lens barrel 100. The lens barrel 100 is provided with a lens 102, which is adhesively attached to the inner wall of the lens barrel 100. Light traveling inside the lens barrel 100 toward the lens 102 includes an effective light ray 104 which is necessary for photographing and an unwanted light ray 105. A light blocking member 103 is provided so as to cover a peripheral part of the lens 102 such that the unwanted light ray 105 traveling toward the lens 102 is blocked.

Japanese Laid-Open Patent Publication No. 2009-116085 discloses the technique of blocking unwanted light rays by providing a light blocking plate over some of the components provided inside the lens barrel (for example, FIGS. 4 and 5).

In the conventional lens barrel 100 shown in FIG. 7, the light blocking member 103 is usually formed by molding of a resin which is composed of a thermoplastic resin, such as ABS (Acrylonitrile-Butadiene-Styrene resin), and carbon black added thereto. An inner rim 103a of the light blocking member 103 need to be tapered at an acute angle in order to prevent generation of flare due to diffuse reflection of the unwanted light ray 105.

FIG. 8 is a schematic cross-sectional view of the inner rim of the conventional light blocking member 103. The light blocking member 103 is constituted of the main material 107 of a resin, such as ABS, and carbon black 108 added thereto.

As shown in FIG. 8, unwanted light rays 105 are reflected by the surface of the light blocking member 103 to enter the lens 102. In some cases, unwanted light rays 105 coming into the gap between the lens 102 and the light blocking member 103 are first reflected by the surface of the lens 102 and then reflected by the surface of the light blocking member 103 to enter the lens 102.

Now, we focus on the extreme edge 103b of the light blocking member 103. For production reasons, the extreme edge 103b is not perfectly an acute angle but has, in actuality, a spherical surface with the radius of curvature of about 0.01 (R≈0.01). Therefore, the unwanted light rays 105 reflected by the extreme edge 103b undesirably enter the lens 102 in many cases. As a result, the unwanted light rays 105 cause optical problems, such as flare and ghost. This means that such an optical problem still remains unsolved even though the light blocking member 103 is provided.

SUMMARY OF THE INVENTION

The present invention was conceived in order to solve the above problems. One of the objects of the present invention is to provide a lens barrel in which reflection of light rays is sufficiently smaller than in the conventional lens barrels and in which optical problems, such as flare and ghost, are less likely to occur.

A lens barrel of the present invention includes: a lens; and a light blocking member provided in the vicinity of the lens for blocking part of light traveling toward the lens, a main constituent of the light blocking member being a thermoplastic elastomer resin.

In one embodiment, the light blocking member is a product of injection molding.

In one embodiment, the thermoplastic elastomer resin contains carbon black as an additive.

In one embodiment, a surface of the light blocking member has roughness.

In one embodiment, the light blocking member has an opening which allows entry of light coming from a subject of photography, the light blocking member blocks part of the light coming from the subject of photography toward the lens.

In one embodiment, the light blocking member is fixedly positioned relative to the lens.

In one embodiment, there is a gap between the lens and the light blocking member.

An imaging device of the present invention includes the above-described lens barrel.

A lens barrel of the present invention is provided with a light blocking member formed by molding of a thermoplastic elastomer resin. Since the thermoplastic elastomer resin has a low reflectance, a lens barrel can be realized in which optical problems, such as flare and ghost, are less likely to occur.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, preferred embodiments of the present invention will be described with reference to the accompanying drawings.

Figure 1:
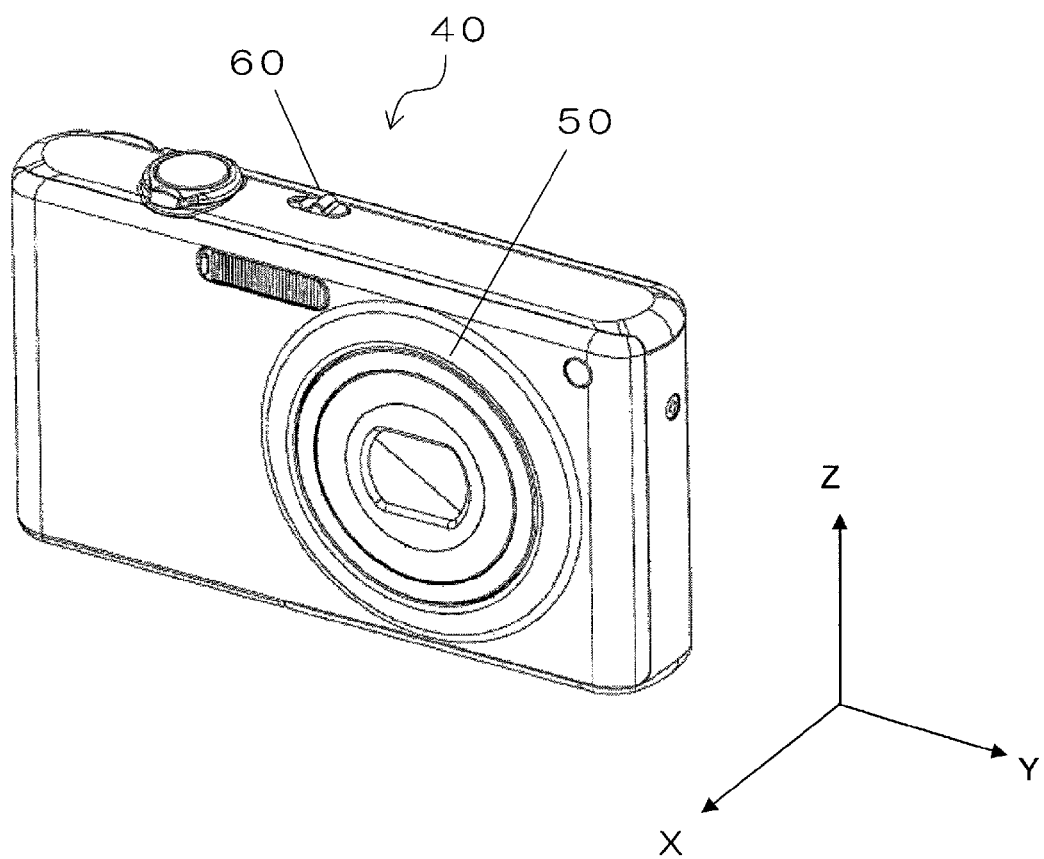
FIG. 1 shows the exterior of a digital camera 40 which includes a lens barrel 50.

FIG. 1 shows the exterior of a digital camera 40 which includes a lens barrel 50. When powered on by a power switch 60, the lens barrel 50 of the digital camera 40 is extended out, and the digital camera 40 becomes ready for shooting.

Note that the digital camera 40 shown in FIG. 1 is merely an example of an imaging device. The present invention is applicable not only to digital cameras but also to film cameras. Also, it may be a camera in which the lens barrel 50 is detachable for replacement. Also, it may not be a still camera but may be a camcorder which is capable of moving picture imaging.

Figure 2:
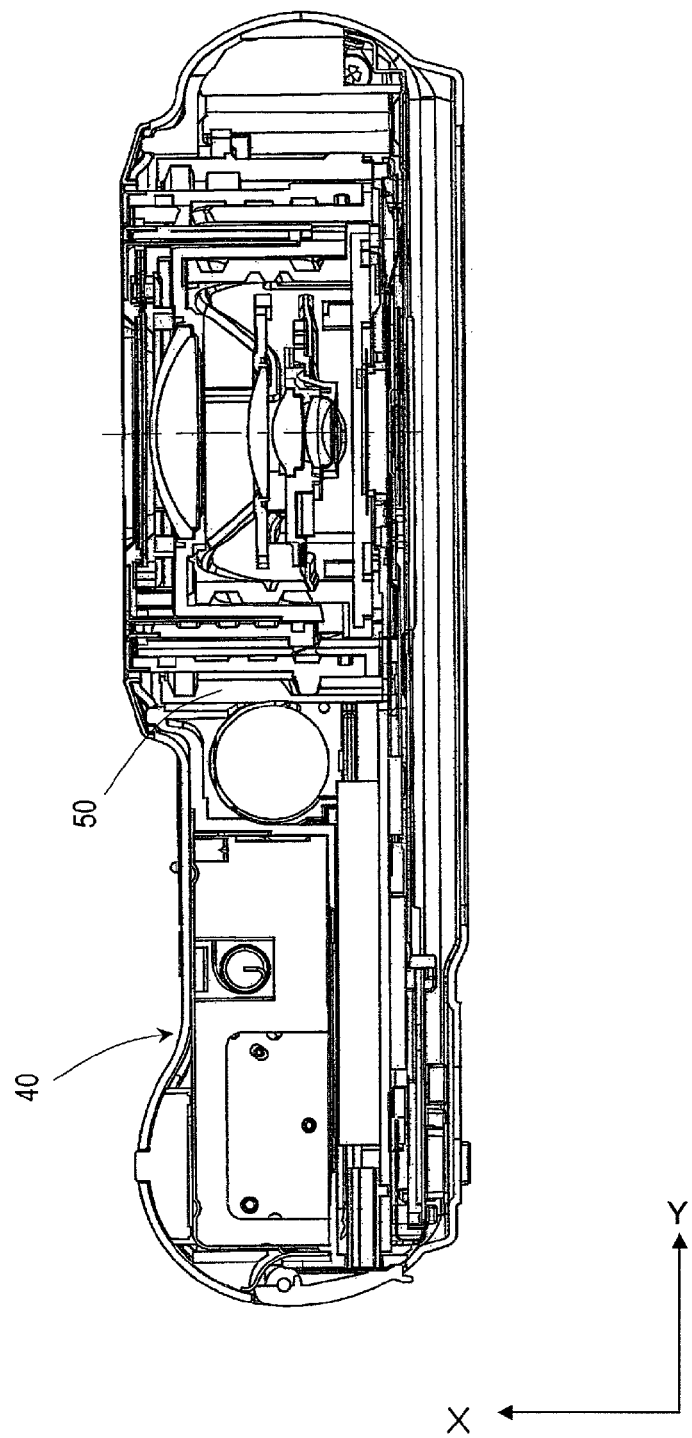
FIG. 2 is a cross-sectional view of part of the digital camera 40 which includes the lens barrel 50.

FIG. 2 is a cross-sectional view of part of the digital camera 40 which includes the lens barrel 50. FIG. 2 shows a cross section of the digital camera 40 which is seen in the direction of the arrow of FIG. 1. The lens barrel 50 is in the retracted state when the power switch 60 is OFF, and is in the extended state when the power switch 60 is ON. In FIG. 2, the lens barrel 50 is in the retracted state.

Figure 3:
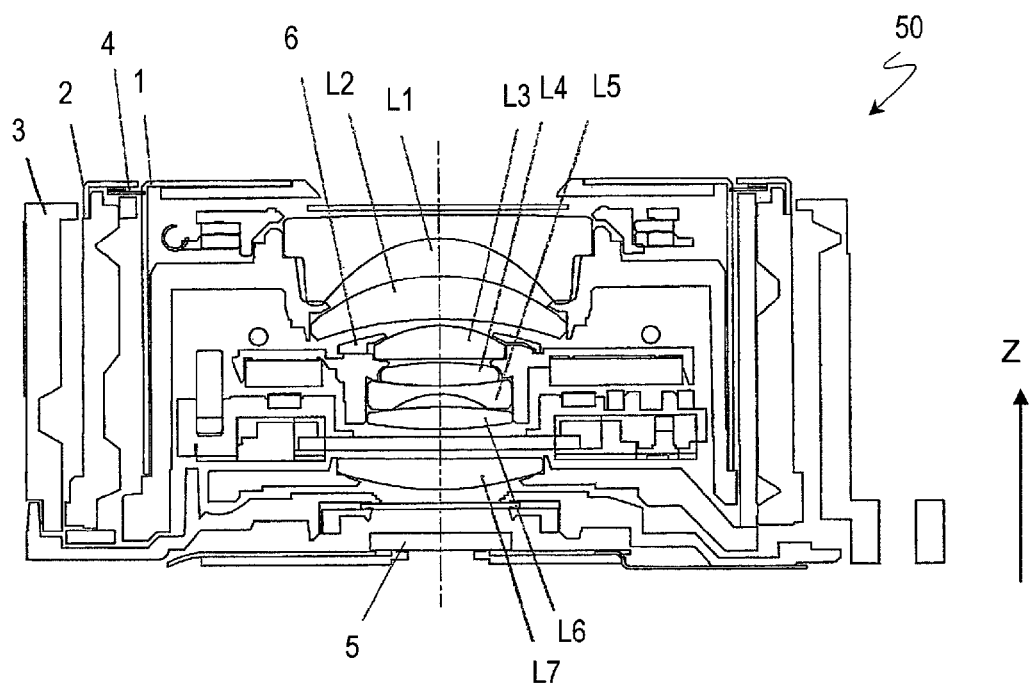
FIG. 3 is a cross-sectional view of the lens barrel 50 which is in the retracted state.
Figure 4:
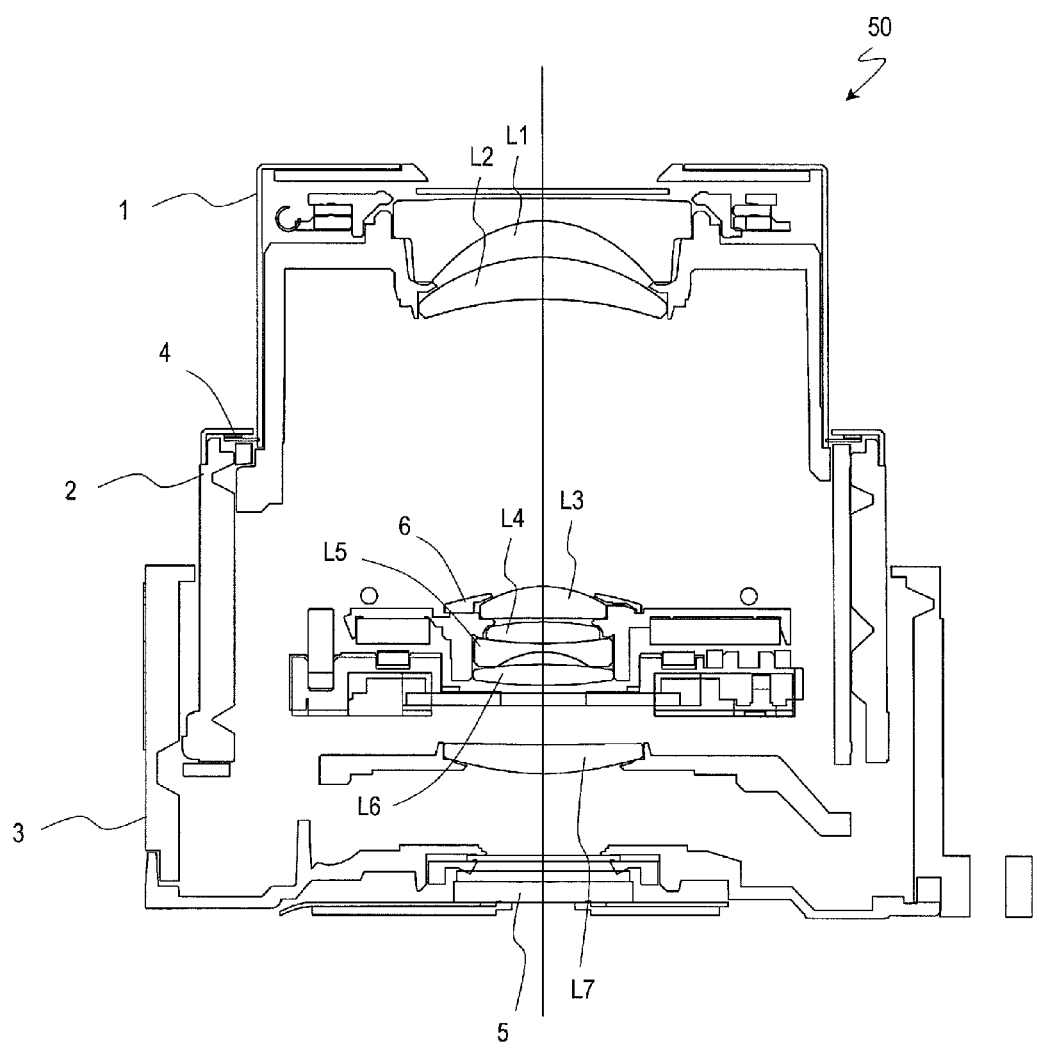
FIG. 4 is a cross-sectional view of the lens barrel 50 which is in the extended state.

FIG. 3 is a cross-sectional view of the lens barrel 50 which is in the retracted state. FIG. 4 is a cross-sectional view of the lens barrel 50 which is in the extended state. Note that, in FIG. 3 and FIG. 4, only main components of the lens barrel 50 are shown for the convenience of understanding. In actuality, the lens barrel 50 may include more components than shown.

Hereinafter, the main components of the lens barrel 50 are described with reference to FIG. 4.

The exterior of the lens barrel 50 includes a lens frame 1, a driving frame 2, and an outer frame 3.

The lens frame 1 is provided with lenses L1 and L2. The driving frame 2 moves relative to the lens frame 1. Provided between the lens frame 1 and the driving frame 2 is a light blocking ring 4. The purposes of the light blocking ring 4 are entirely blocking entry of light rays via the gap between the lens frame 1 and the driving frame 2 and blocking entry of extraneous materials (e.g., dust) via the gap between the lens frame 1 and the driving frame 2. For these purposes, the light blocking ring 4 is not provided inside the lens barrel 50 but is provided at a position between the lens frame 1 and the driving frame 2 and near an edge of the driving frame 2 from which the lens frame 1 comes out. The outer frame 3 is secured to the casing of the digital camera 40.

Inside the lens barrel 50, lenses L3 to L7 and an imaging element 5 are provided. Now, the description is focused on the lens L3.

In the present embodiment, a light blocking member 6 is provided in the vicinity of the lens L3. The light blocking member 6 extends along the perimeter of the lens L3 and covers peripheral part of the lens L3. The light blocking member 6 can prevent unwanted light rays, which would generate flare and ghost, from entering the lens L3. The reason why the light blocking member 6 is provided in the vicinity of the lens L3, which is located at a relatively deep position inside the lens barrel 50, is that the degree of flare resulting from unwanted light is larger as the unwanted light enters a lens closer to the imaging element 5.

Now, the light blocking member 6 is described in more detail with reference to the drawings FIG. 5.

Figure 5:
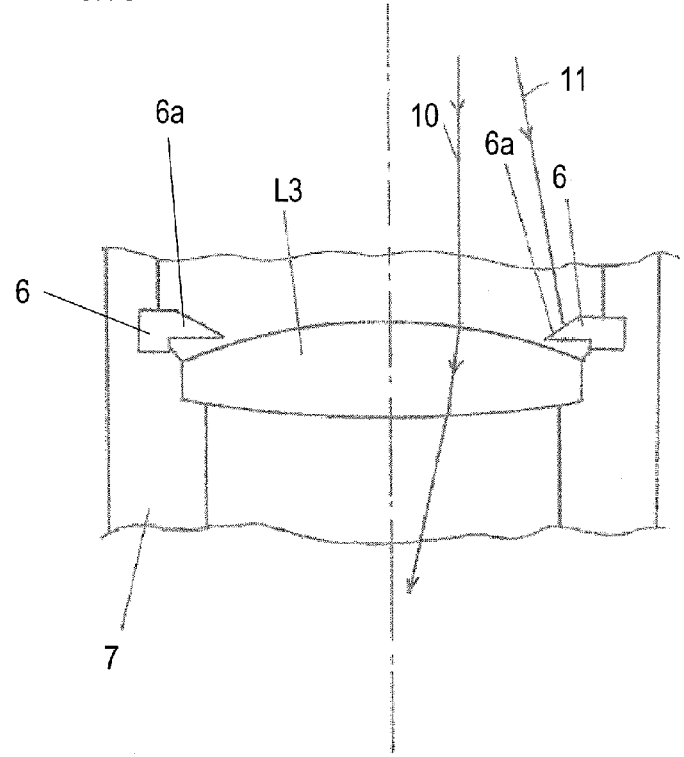
FIG. 5 is a partially enlarged view of the lens barrel 50, which illustrates the positional relationship between a lens L3 and a light blocking member 6.

FIG. 5 is a partially enlarged view of the lens barrel 50, which illustrates the positional relationship between a lens L3 and a light blocking member 6. The lens L3 is adhesively attached to a lens holding frame 7 of the lens barrel 50. The light blocking member 6 extends along the perimeter of the lens L3 and has an overhanging portion extending radially inward of the lens L3. The light blocking member 6 having such a structure blocks entry of an unwanted light ray 11 into the lens L3 via a peripheral area of the lens L3. The unwanted light ray 11 is, for example, a light ray reflected by the inner wall of the lens barrel 50 after entry into the lens barrel 50. With the light blocking member 6, only effective light rays 10 from a subject of photography enter the lens L3.

An inner rim 6a of the light blocking member 6 is tapered at an acute angle in order to prevent generation of flare due to diffuse reflection of the unwanted light rays. The present inventor found that the unwanted light rays which are transmitted through the inner rim 6a can be greatly reduced by appropriate selection of the materials of the light blocking member 6. Hereinafter, the details of the light blocking member 6 are described with reference to FIG. 6.

Figure 6:
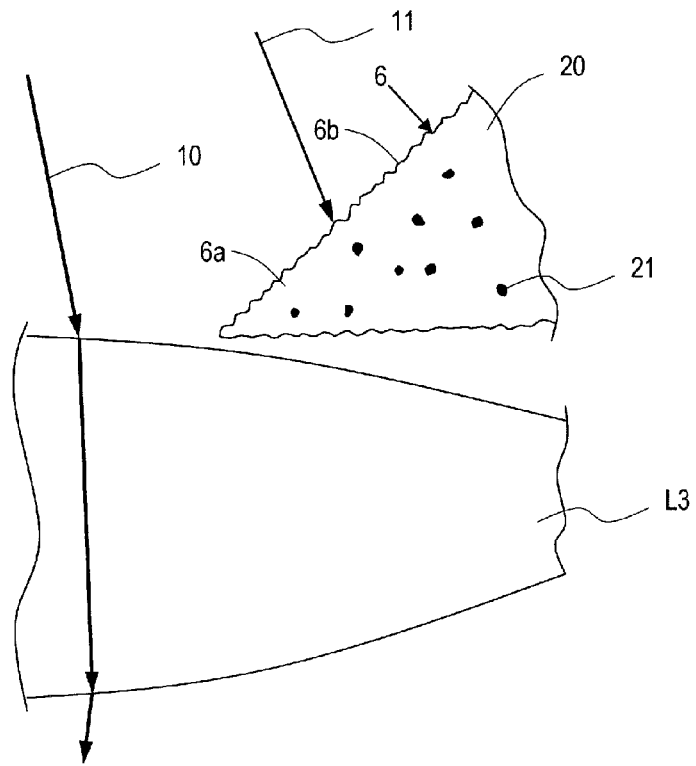
FIG. 6 is a schematic cross-sectional view of an inner rim 6a of the light blocking member 6.
Figure 7:
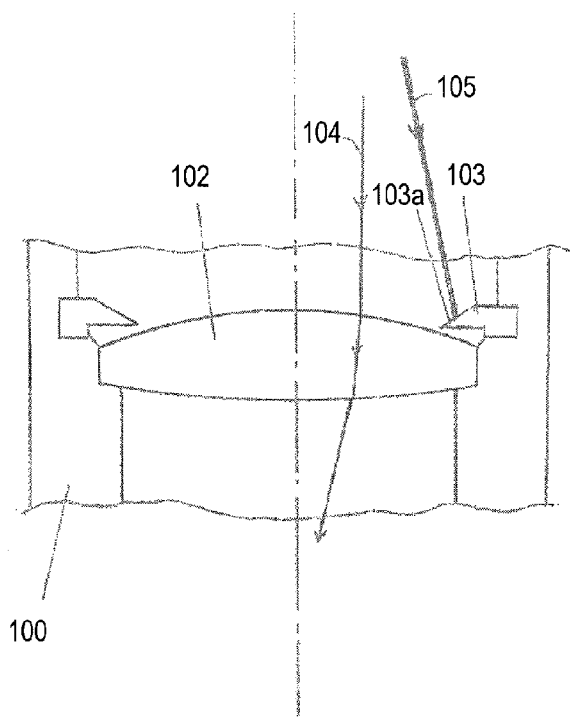
FIG. 7 is a partially enlarged view of a conventional lens barrel 100.
Figure 8:
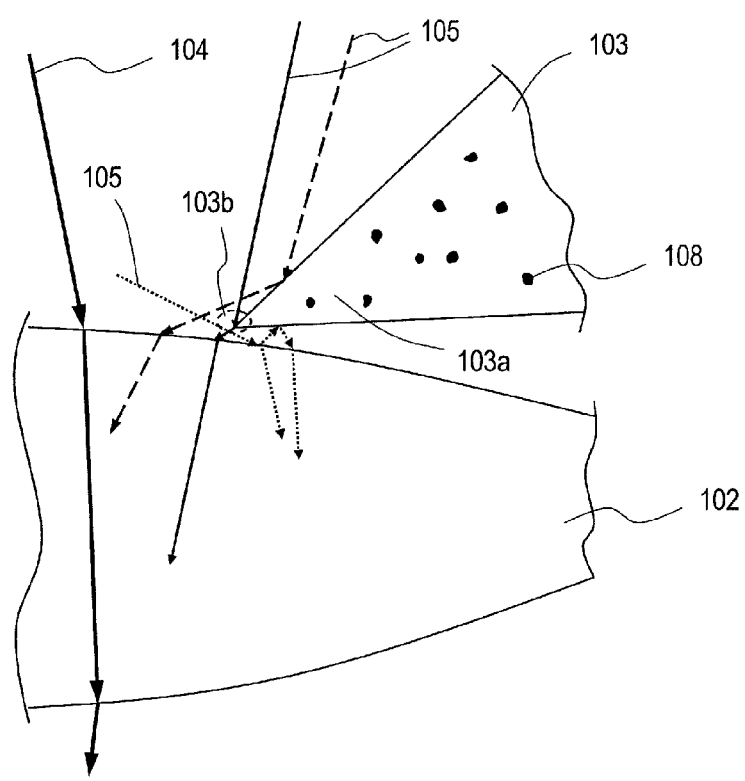
FIG. 8 is a schematic cross-sectional view of an inner rim of a conventional light blocking member 103.

FIG. 6 is a schematic cross-sectional view of the inner rim 6a of the light blocking member 6.

The light blocking member 6 of the present embodiment is a product of injection molding of a resin material which contains a thermoplastic elastomer resin 20 as the main constituent and carbon black 21 as an additive.

The reflectance of the thermoplastic elastomer resin is lower than those of other resins (e.g., ABS). Therefore, only by forming the light blocking member 6 of the thermoplastic elastomer resin, the reflection of the unwanted light rays can be reduced as compared with the conventional light blocking member 103. With the light blocking member 6 formed of the thermoplastic elastomer resin, entry of reflected unwanted light rays into the lens L3 can be blocked even if the inner rim 6a which is tapered at an acute angle microscopically has a spherical surface.

The thermoplastic elastomer resin exhibits rubber-like elasticity over a wide temperature range. In other words, as compared with acrylic resins, the thermoplastic elastomer resin is a relatively elastic material. In general, inside a structure in which the positions of the lenses need to be accurately determined, such as a lens barrel or the like, a material which is relatively elastic and therefore makes it difficult to accurately fix the positions is not used. However, in the present embodiment, the thermoplastic elastomer resin is used as the main constituent of the light blocking member 6. The light blocking member 6 does not affect the positioning of the lenses and relevant elements and therefore does not obstruct accurate determination of the lens positions.

Since the material of the light blocking member 6 contains the carbon black 21 as an additive, the light blocking member 6 is less likely to transmit the unwanted light rays. Particularly, it is possible to block transmission of the unwanted light rays through the inner rim 6a which is tapered at an acute angle and therefore has a smaller thickness. Therefore, a lens barrel can be realized in which transmission of unwanted light rays is small and in which optical problems, such as flare and ghost, are less likely to occur.

The surface of the light blocking member 6 of the present embodiment has fine roughness 6b in order to further reduce the reflection of the unwanted light rays. The light blocking member 6 having such a configuration can be formed by injection molding of the thermoplastic elastomer resin 20 using a mold which has a roughened surface (not shown). The thermoplastic elastomer resin exhibits excellent transferability in molding, and therefore, excellent fine roughness can be formed over the surface of the light blocking member 6.

The method of forming the roughened surface in the mold may be selected from a wide variety of methods. For example, a mold may be subjected to a blasting process. The roughness 6b of the present embodiment may be obtained by performing, for example, a blasting process on a mold such that a smooth mold surface is modified to a roughened surface with the 10-point average roughness of 2 to 6 μm. The abrasive grains used for the blasting process may have any shape, for example, an irregular shape, a spherical shape, an elliptical shape, etc., and may be formed of a material containing alumina, for example.

Now, the light blocking member 6 of the present embodiment and the light blocking ring 4 (FIG. 3, FIG. 4) are described.

As described above, the light blocking member 6 and the light blocking ring 4 have the same function in terms of blocking of unwanted light rays. However, the positions they are placed, the materials, and other details are greatly different.

The light blocking member 6 of the present embodiment is provided in the vicinity of the lens L3 and is fixedly positioned relative to the lens L3. On the other hand, the light blocking ring 4 is provided between the lens frame 1 and the driving frame 2 and is not fixedly positioned relative to the lens. The position of the light blocking ring 4 relative to the lens is variable.

The light from a subject of photography travels through an opening and the lenses L1 and L2 (FIG. 4) to enter the lens barrel 50. The light that has entered the lens barrel 50 is, for example, partially reflected inside the lens barrel 50 to advance toward the lens L3. However, this unwanted light ray (unwanted reflection) is blocked by the light blocking member 6. The light blocking member 6 is located at a relatively deep position inside the lens barrel 50. The light blocking member 6 does not intend to block entry of extraneous materials, such as dust. Therefore, there is a gap (space) between the light blocking member 6 and the lens L3. In other words, the light blocking member 6 is not in contact with the lens L3. On the other hand, the light blocking ring 4 is located at a position between the lens frame 1 and the driving frame 2 and near an edge of the driving frame 2 from which the lens frame 1 comes out. The light blocking ring 4 entirely blocks entry of unwanted light rays via the gap between the lens frame 1 and the driving frame 2. Also, the light blocking ring 4 tightly closes the gap between the lens frame 1 and the driving frame 2, thereby blocking entry of extraneous materials, such as dust.

The main constituent of the light blocking member 6 is a thermoplastic elastomer resin. Also, the light blocking member 6 is fixedly positioned relative to the lens and does not come in contact with the driving frame 2 which is a slidable element. Therefore, the problems of sliding load and generation of noise do not arise. On the other hand, to completely close the gap between the lens frame 1 and the driving frame 2, the light blocking ring 4 is in contact with the driving frame 2 such that the light blocking ring 4 is pressed against the driving frame 2 and is slightly deformed when it is in place. For such reasons, the main constituent of the light blocking ring 4 is commonly a rubber material. Since the light blocking ring 4 slides over the lens frame 1, the material of the light blocking ring 4 usually contains an additive for improving the slidability, such as fluorine or the like. Thus, the sliding load between the light blocking ring 4 and the lens frame 1 can be reduced, and generation of noise can be prevented.

A lens barrel of the present invention which includes a light blocking member is capable of greatly reducing unwanted light rays which enters a lens, so that occurrence of optical problems, such as flare and ghost, can be prevented. With such a lens barrel, an imaging device can be obtained which is capable of obtaining a high quality photographing result.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2009-178593 filed on Jul. 31, 2009 and No. 2010-165534 filed on Jul. 23, 2010, the entire contents of which are hereby incorporated by reference.

What is claimed is:

1. A lens barrel, comprising:
   a lens; and
   a light blocking member provided in the vicinity of the lens for blocking part of light traveling toward the lens, a main constituent of the light blocking member being a thermoplastic elastomer resin;
   wherein the light blocking member is spaced apart from the lens so as to not affect positioning of the lens, and
   an inner rim of the light blocking member is located more downstream, in a direction of travel of light along an optical axis of the lens, than a light-incident surface of a thickest portion of the lens.

2. The lens barrel of claim 1, wherein the light blocking member is a product of injection molding.

3. The lens barrel of claim 1, wherein the thermoplastic elastomer resin contains carbon black as an additive.

4. The lens barrel of claim 1, wherein a surface of the light blocking member has roughness.

5. The lens barrel of claim 1, wherein
   the light blocking member has an opening which allows entry of light coming from a subject of photography,
   the light blocking member blocks part of the light coming from the subject of photography toward the lens.

6. The lens barrel of claim 1, wherein the light blocking member is fixedly positioned relative to the lens.

7. The lens barrel of claim 1, wherein there is a gap between the lens and the light blocking member.

8. The lens barrel of claim 2, wherein a surface of the light blocking member has roughness.

9. The lens barrel of claim 3, wherein a surface of the light blocking member has roughness.

10. An imaging device, comprising the lens barrel as set forth in claim 1.

11. The lens barrel of claim 1, wherein an inner rim of the light blocking member is tapered at an acute angle.

* * * * *